United States Patent [19]

Jackowski

[11] 3,762,727

[45] Oct. 2, 1973

[54] OIL SEAL

[76] Inventor: James E. Jackowski, 1016 S. Humphrey, Oak Park, Ill.

[22] Filed: Mar. 15, 1971

[21] Appl. No.: 124,015

[52] U.S. Cl. .................................. 277/41, 277/84
[51] Int. Cl. ........................ F16j 15/40, F16j 15/34
[58] Field of Search .................. 277/42, 84, 48, 25, 277/95, 39, 41

[56] References Cited
UNITED STATES PATENTS

| 2,509,461 | 5/1950 | Ulseth | 277/39 |
| 3,279,803 | 10/1966 | Sekulich | 277/41 X |
| 3,368,819 | 2/1968 | Otto | 277/25 |
| 3,120,959 | 2/1964 | Jensen et al. | 277/89 X |

FOREIGN PATENTS OR APPLICATIONS

| 637,097 | 5/1935 | Germany | 277/38 |

Primary Examiner—Samuel B. Rothberg
Attorney—James T. FitzGibbon

[57] ABSTRACT

An oil seal of the type wherein the principal seal is made between the face of a first casing member attached to a rotary shaft or disposed in a machine housing and a flexible washer of a lubricous, high temperature resistant polymer held in place within a second casing and urged axially into engagement with the face of the first casing. The seal assembly is a so-called unitized seal, that is, both the relatively fixed and relatively movable casings are preassembled so that the two-piece unit may be fitted as a whole to a shaft and a machine bore while the unit remains assembled. In one embodiment, the flexible, polymeric sealing washer or ring is urged into engagement with the radial face of the casing by an inclined coil spring. In use, the seal is characterized by low wear, by a hydrodynamic sealing action, by relatively great tolerance to radial runout, and by easy and accurate installation which inherently supplies a desired axial preload to the primary seal components.

1 Claim, 6 Drawing Figures

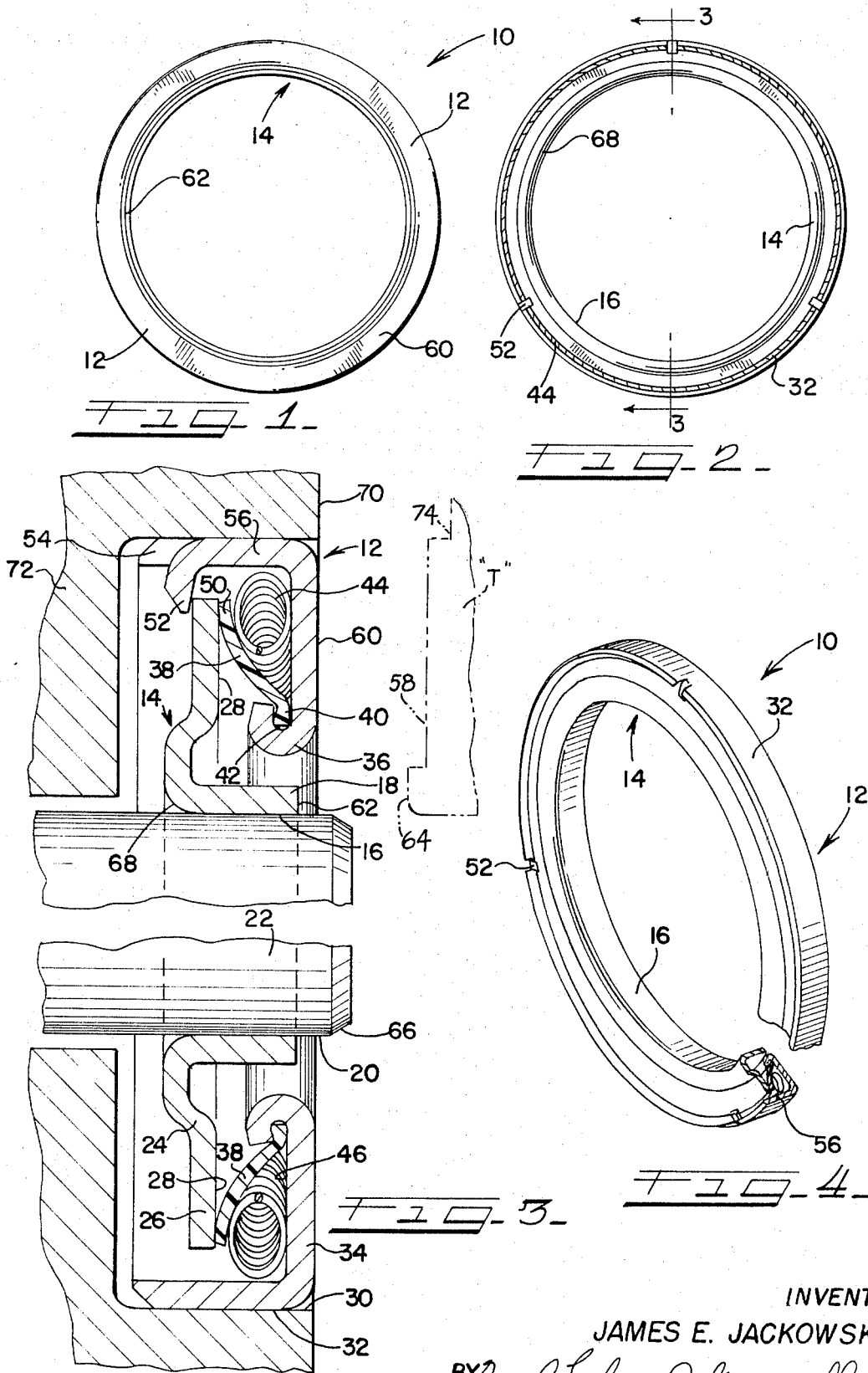

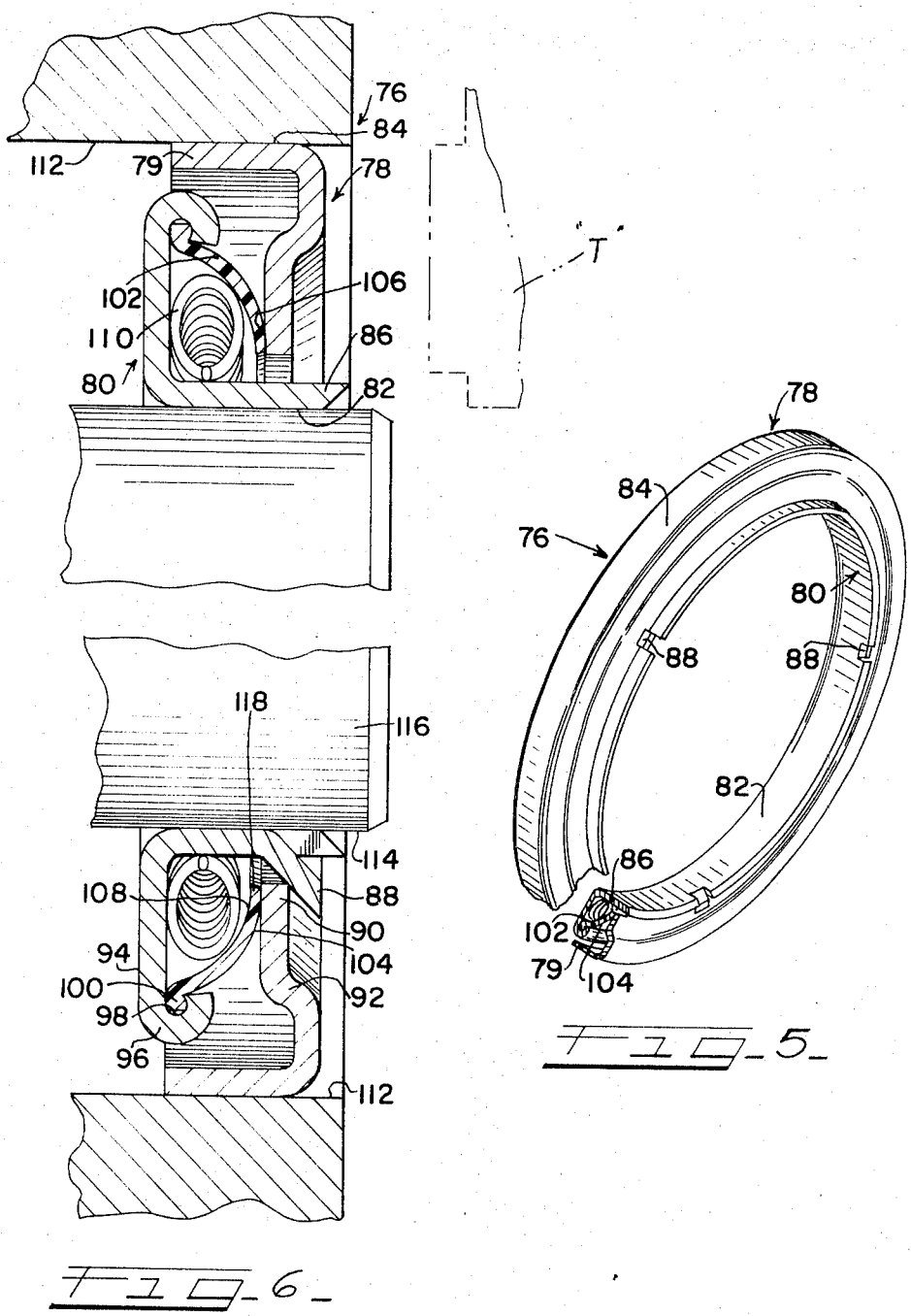

OIL SEAL

BACKGROUND OF THE INVENTION

The present invention relates to oil seals, and more particularly to so-called unitized oil seals, that is, seals of a construction wherein both wearing surfaces which form the primary seal are contained within the seal unit itself rather than to constructions wherein one surface to be sealed against forms a part of the machine housing or shaft to be sealed. The seal of the present invention is a so-called end face seal, that is, a seal in which the primary seal is made against a radially extending, axially facing surface, and, in the present invention, the primary seal is a fuorocarbon-to-metal seal, for reasons which will be set forth in detail herein.

Fluid seals, including oil seals, and the like, are known in the prior art, and seals having a fluorocarbon primary sealing element are also known in the art. However, it is also well known to those skilled in the art that a number of such prior art seals have presented certain problems and disadvantages which have not heretofore been able to be overcome, and as a result, it has not always been possible to take full advantage of the desirable characteristics of "Teflon" or other lubricous fluorocarbon materials in constructing fluid seals. For example, among the advantages of "Teflon" or other fluorocarbon polymers are resistance to high temperatures and almost total chemical inertness, with the result that the prospective life of such polymers in use is exceptionally long, from a theoretical standpoint.

Furthermore, polytetrafluoroethylene or similar fluorocarbons or the like are by their own nature lubricous, and as a result, tend to have extensive wearing lives in use, and do not present serious problems of wearing, galling or scoring the surfaces with which they are associated in use. However, in the past, for various reasons, including certain reasons which will be referred to herein, tetrafluoroethylene or other fluorocarbon seal units have not proved practical for a wide variety of installations, particularly installations wherein low cost is necessary.

For example, prior art fluorocarbon seals have often been characterized by rather complex structures, since, by reason of its chemically inert nature, Teflon and its equivalents are not able to be bonded adhesively to metal flanges, casings, and the like. Furthermore, Teflon is a thermoplastic material rather than an elastomeric material and therefore, a major portion of the deflection and defomration which are necessary to accommodate radial or axial runout or other dimensional variation must be supplied by extrinsic forces, such as tensioning springs, sealing lip or face positioners, or the like. Furthermore, although providing long life in normal use, the finished primary sealing surface of fluorocarbon sealing elements is soft and non-resilient, rather than elastomeric or resilient, and therefore, if cut, scratched or nicked during installation, it will retain this condition and will not provide satisfactory service in use. In other words, scratches or other marks on the wearing face, even when present only to a minor extent, will remain in the surface, and since such polymers are relatively non-resilient, as pointed out, the finished element cannot deform so as to form a proper seal, as a softer rubber might, for example. Furthermore, rubber, being more flexible, is unlikely to be damaged in installation, and, as a practical matter, does not present this problem at all.

Another drawback which has characterized prior art fluorocarbon seals is that, because of the lack of elastomeric character of the Teflon material, close dimensional tolerances must be observed in manufacturing and installation, since, in the event tolerances are too loose, a faulty seal would be developed, and in the event that tolerances were unduly tight, excessive force would be presented to the wearing surface. Teflon or the like has practically no ability to accommodate such irregularities, whereas rubber is very tolerant thereof.

Accordingly, in view of these and other drawbacks, and in view of the theoretical advantages possible with fluorocarbon seals, an object of the present invention is to provide an improved fluorocarbon seal which would permit the inherent advantages of a fluorocarbon material to be realized without being characterized by the disadvantages which have been associated with this general class of seal in the past.

Another object is to provide an improved Teflon or like fluorocarbon seal in which thee primary seal is an end face seal.

Another object is to provide a unitized oil seal assembly which may readily be installed by relatively unskilled personnel without the danger of damaging mating parts thereof.

A still further object is to provide a unitized face seal having a fluorocarbon or like relatively chemically inert primary seal.

Another object is to provide a seal unit which is characterized by relatively large tolerance to radial excentricity between the centers respectively of a bore in a machine housing and a shaft to be sealed.

Another object is to provide a seal assembly which may be fitted to a predetermined axial depth of position in a machine opening by pressing both casings which make up the assembly with a single tool or in a single operation, which will thereupon serve to locate the assembly properly and simultaneously for subsequent use.

Another object is to provide a seal assembly having one or more of the foregoing advantages and characteristics and characterized in that the Teflon washer portion is carried by and held fixed in relation to the outer casing.

A further object is to provide another form of seal having one or more of the foregoing advantages, and characterized in that the Teflon washer is held fixed in relation to the inner or shaft-engaging casing of the seal assembly.

A further object is to provide a fluorocarbon seal which is simple to assemble and accordingly, a seal which may be produced at an economical cost so as to be readily available for widespread use.

Another object is to provide some or all of the foregoing advantages in a seal unit having very low friction and low torque losses and which will provide excellent sealing performance, including a long life expectancy in use.

Another object is to provide a fluorocarbon containing seal unit having novel means for urging the fluorocarbon member into a position of engagement with a sealing face of an associated portion of the seal.

The present invention provides these and other advantages by providing a unitized seal assembly, containing a fluorocarbon primary end face seal member and having oppositely disposed inner and outer casing elements, wherein the fluorocarbon seal is in the form of an annular member held in fixed relation to one of said casing elements, and wherein means are provided for urging the sealing element against an oppositely directed, radially extending face of the other casing element portion of the unitized seal assembly.

The manner in which the foregoing and other inherent objects and advantages of the invention are achieved will become more clearly apparent when reference is made to the following detailed description of the preferred embodiments of the invention, and to the drawings, in which like reference numbers indicate corresponding parts throughout.

BRIEF DESCRIPTION OF THE DRAWINGS

FIG. 1 is an elevational view of one end of the oil seal unit of the invention;

FIG. 2 is an elevational view of the other end of the assembled seal unit of the invention;

FIG. 3 is a vertical sectional view through a machine housing and an associated shaft, showing one embodiment of the novel seal unit of the invention in position of use;

FIG. 4 is a perspective view of the seal unit of the invention with portions broken away, showing both relatively movable parts of the seal in their assembled relation prior to installation thereof with an associated machine housing and rotary shaft;

FIG. 5 is a perspective view of a modified form of seal unit according to the invention, showing portions broken away and showing the unitized seal in its assembled relation prior to installation; and FIG. 6 is a greatly enlarged vertical sectional view of the form of seal unit shown in FIG. 5.

DESCRIPTION OF THE PREFERRED EMBODIMENTS OF THE INVENTION

Although it will be understood that the invention may be embodied in a number of forms and applied to various uses, the nature of the invention will be illustrated by reference to those embodiments wherein a shaft is to be sealed against leakage from oil and wherein the shaft extends through an opening in a machine housing which is bored to receive a shaft and counterbored to receive the seal.

Thus, referring now to FIG. 1, one form of seal according to the invention is generally designated 10 and includes a generally radially outer casing 12, and a radially inner casing 14 enclosing other elements to be described. Referring now to FIG. 3, it is shown that the inner surface 16 of the axially extending flange 18 forming a portion of the inner casing 14 engages the radially outer surface 20 of a rotary shaft 22, and that the axially extending flange 18 is integrally formed with a transition section 24 which is in turn joined to a generally radially extending flange 26 having an axially facing inner surface 28. The outer casing 12 is inserted in position of use within the counterbore 30 with the outer surface 32 of the casing 12 snugly engaging inner surfaces of the counterbore 30. A radially inwardly extending flange 34 terminates in a curl portion 36 in which is received a generally annular one-piece fluorocarbon polymer sealing element 38. The inner margin 40 of the sealing element 38 is locked in place against rotation within the bight 42 formed by the curl 36.

In the illustrated embodiments, a flattened helical spring 44 is disposed between the radially extending axially facing surface 46 of the outer casing 12, and the rear or non-working surface 48 of the sealing element 38 so as to urge the radially outer margin 50 of the sealing element against the primary sealing surface 28 of the inner casing 14. By reference to FIG. 3, it will also be seen that inwardly extending locking tabs 52 are provided which are struck inwardly from and integrally formed with axially innermost margins 54 of the outer casing 12. Thus, it can be seen that locking the tabs 52 urges the radial flange 26 toward an axially outward position of use, while the spring 44 acting through the fluorocarbon sealing element 38 urges the sealing element 38 and consequently the inner casing 14 in an opposite axial direction.

Therefore, as assembled, the seal unit 12 will have a maximum axial dimension determined by the forward extent of the margin 54 of flange 56 and by the maximum axial movement which the tab 52 permits the radial flange 56 to move. It is also clear that the maximum axial movement in the opposite direction will be limited by engagement of the flange 26 or the transition section 24 with the axially inner portion of the curl 36 disposed on the inner margin of the flange 34. In the use of the seal, the desired axial dimension lies between these two extremes, it being understood that flange 26 should desirably not engage the tabs 52 nor the curl 36. Having this in mind, another desirable feature of the invention may be understood, namely, that installation of the seal unit is facilitated by the use of a simple tool "T" shown in phantom lines in FIG. 3. By reference to FIG. 3, it will be understood that installation off the unitized seal 10 of the invention is accomplished in a simple and straightforward manner merely by aligning the outer surface 32 of the outer casing 12 with the counterbore 30 with which it will be associated in use, and, using a tool such as a tool "T," pressing the unit axially inwardly of the bore 30 with a face 58 of the tool "T," engaging an oppositely directed face 60 of the flange 34. Since the inner surface 16 of flange 18 is sized for a snug but sliding fit over the shaft 22, resistance to axial movement thereof may be overcome by engaging the end surface 62 of flange 18 with a reduced diameter, axially offset annular face 64 on tool "T." Initial fitting of the flange 18 over the shaft 22 is aided by a chamber 66 on the shaft 20 and by a radius 68 on the transition portion 24 of the inner casing 14.

Referring to a typical installation, such as that illustrated in FIG. 3, it is shown that the face 60 of flange 34 is flush with the surface 70 of the machine housing 72 in which the counterbore 30 is formed. FIG. 3 also illustrates that flange 18 is disposed such that the end face 62 thereof lies slightly axially inwardly of the plane of flange surface 60. Accordingly, it may be seen that, in the simplest case of installation, the tool "T" would be merely a flat ring, and, in the finally assembled position of use, surfaces 60, 62 and 70 would be coplanar. In another case, such as that which might be brought about by the use of a tool "T" having axially offset surfaces 58 and 64 already described, and further including a third offset surface 74, all faces 60, 62 and 70 might be in a predetermined axially offset relation to each other. It is also clear that other combinations of the above could be made, including a combination wherein end face 62 would lie axially outwardly of one or both of the surfaces 60, 70.

However, referring to a typical and advantageous use of the seal unit 10 of the invention, the parts would desirably be dimensioned so that the depth of counterbore 30 would have a predetermined minimum dimension without the need for any maximum tolerance, depth, that is, the depth of the counterbore 30 might arbitrarily be set so as to be at least 0.060 inches larger than the maximum anticipated axial dimension of the flange 56. The tool "T" would then comprise merely a large diameter ring, and the surfaces 16, 32, might include a rubber like or resinous coating of known type used with oil seals thereon to insure a fluid-tight seal. For installation, both seal casings 12, 14 are placed in the desired alignment, and the tool "T" is pressed axially until all surfaces 60, 62 and 70 are flush. This inherently serves to preload the spring 44 to a desired extent, and provides a sufficient axial working clearance between tabs 52 and the outer margins of flange 26, while the surface 28 is gently but firmly pressed against the margin 50 of the sealing element 38.

By reference to the foregoing, it will be appreciated that the sealing element 38 has been protected against the possibility of being scratched or damaged during installation, since the preassembled casings 12, 14, which are held together by tabs 52, serve to surround and protect the element 38. Provision of the radius 68 facilitates initial alignment of the inner casing 14 with the shaft 22, and inasmuch as the primary seal is an end face seal rather than a radial or lip seal, relatively great radial runout of the shaft 22 relative to bore 30 can be accommodated without compromise of sealing effectiveness.

Another feature of the invention is the provision of the inclined helical spring 44. Although other forms of springs are useful with the invention, a helical spring of this type, while known per se, has not heretofore been believed to have been used in applying an axial force against a sealing element of an end face type seal. Such a spring is not only economical, but tends to be self-centering, it need not be fastened to the flange 12 to be retained in place, and it exerts a relatively constant, uniform pressure throughout its circumferential extent. In the past, most face seals have used finger or diaphragm type springs which were locked in place by flanges or otherwise required and additional assembly operation, and were often made from large diameter stampings which were wasteful of material.

As may be further appreciated by reference to FIG. 3, assembly of the seal unit of the invention is very simple, with only one element, namely the sealing element 38, being required to be locked in place by a crimping operation. The spring 44 is disposed behind the element 38, and, with the casing 14 placed in the illustrated relation, the tabs 52 are struck inwardly to form the unitized seal into an assembled but not rigid unitary relation. Since the primary seal is a fluorocarbon-to-metal seal, the seal is characterized by low starting torque, low friction, and substantial self-lubrication.

Referring now to FIGS. 5 and 6, another form of seal unit 76 according to the invention is shown to include an outer casing 78 and an inner casing 80, the latter including a radially inwardly facing, annular surface 82, while the outer casing 78 includes a radially outwardly facing, circumferentially extending surface 84 formed on an axially extending flange 79.

FIG. 6 shows that the inner casing 80 includes a generally axially extending flange 86, on which surface 82 is formed, a plurality of tabs 88 (one only shown in FIG. 6) for engaging an inner margin 90 of the radial flange 92 of the outer casing 78. An inner casing radial flange 94 extends outwardly from the axial flange 86 and terminates in a curl 96 having a bight 98 receiving the radially outer margin 100 of the annular sealing element 102 which is also in the form of a flexible but generally non-resilient fluorocarbon washer. One axial face 104 of the sealing element 100 engages an inner axial face 106 of the radial flange 92, while the opposite face 108 thereof is engaged by the spring 110 which is backed up by radial flange 94 and which therefore urges the element 102 into sealing engagement against the surface 106 of flange 92 with a predetermined force.

In this embodiment, the spring 110 is also preferably an inclined helical spring which acts principally axially rather than radially. As in the other embodiment, the axial flange 79 is engaged in a snug sealing relation with a counterbore 112, while the inner surface 82 fits snugly over the outer surface 114 of a rotatable shaft 116. The embodiment of FIGS. 5 and 6, the inner casing 80 and its associated elements are rotated in use and hence are subjected to centrifugal force; however, since the primary sealing surface 104 of the element 102 is located radially inwardly of the bight 98 locking the element in place, centrifugal force, to the extent that it is effective, tends to draw the inner margin 118 of the sealing element 102 more tightly against the surface 106 of flange 92 rather than tending to separate the element 102 from the flange 92. Furthermore, centrifugal force tends to urge the spring radially outwardly, causing any forces thus generated to act to push the inner margin 118 of the element into tighter engagement with the flange 102.

In other respects, the unitized seal unit 76 of FIGS. 5 and 6 is similar to the embodiment shown in FIGS. 1-4. A tool "T" is used in the same manner for installation to a desired, predetermined position within the counterbore 112. In reference to FIGS. 3 and 5, it will be appreciated that, in use, there is ordinarily a small but definite working clearance between the tabs 52, 88 and the radial flanges 26, 92, so that the tabs 52, 88 hold the seal units 10, 76 in their preassembled or unitized forms prior to installation, but preferably do not frictionally engage each other after installation.

In use, seals of this type are competitive from a cost standpoint with very large diameter lip seals, which are commonly molded seals, since molds for forming very large diameter seals are quite expensive. Accordingly, seals of the described type are useful and competitive with other seals when applied to engine crankshafts and other like applications. In use, it has been found that a hydrodynamic action occurs, that is, the oil film wetting the surfaces 28, 106 tends to lift the fluorocarbon element 38, 102 very slightly off the surfaces 28, 106, thereby permitting high peripheral linear speeds, such as 6,000 feet per minute or more, without rapid wear or overheating. Nevertheless, the constructions illustrated provide excellent static seal characteristics and therefore resist leakage even when the engine or other assembly with which they are associated are not in use.

It will thus be seen that the present invention provides easily installed unitized oil seal assemblies having fluorocarbon sealing elements and having a number of advantages and characteristics, including those referred to herein and others which are inherent in the invention.

It is anticipated that a number of modifications and variations of the desired embodiments will occur to

I claim:

1. An end face oil seal assembly for maintaining a fluid-tight seal between two relatively movable parts comprising, in combination, inner and outer casing elements, a sealing element comprised of a fluorocarbon material, and spring means for urging said sealing element in a generally axial direction, one of said casing elements having a generally circumferentially extending flange portion with a given axial extent, and the other of said casing elements also having a generally circumferential flange portion with a given axial extent, each of said casings also having generally radially extending flanges which are axially spaced apart and disposed with the inner surfaces thereof in at least partially axially facing relation to each other, one of said axial flanges having a face adapted to be received in snug sealing engagement with a portion of a machine housing and the other of said axial flanges having a face adapted to be received by a portion of a relatively rotatable shaft, said sealing element being a single element, being disposed within the space defined between said inner sur-faces of said radial flanges, and having one marginal portion thereof locked against relative motion with respect to said outer casing element, and a second marginal portion of said sealing element being adapted to engage said inner surface of said radial flange of said other casing to form a primary end face seal therewith, saidd spring means being disposed within said defined space and urging said second margin of said sealing element axially into engagement with said inner surface of said radial flange, said assembly further including means on one of said casings for engaging a portion of the other of said casings to prevent axial separation thereof.

* * * * *